US008072371B2

(12) United States Patent  
Gum (10) Patent No.: US 8,072,371 B2  
(45) Date of Patent: Dec. 6, 2011

(54) MULTIPLE-MODE LOCATION DETERMINING METHODS AND SYSTEMS (75) Inventor: Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 12/126,818

(22) Filed: May 23, 2008

(65) Prior Publication Data

US 2009/0289845 A1 Nov. 26, 2009

(51) Int. Cl.
*G01S 19/32* (2010.01)
(52) U.S. Cl. .................................. 342/357.12
(58) Field of Classification Search ............. 342/357.01, 342/357.06, 357.08, 357.13, 357.15, 357.25, 342/357.31, 357.72; 701/213, 215
See application file for complete search history.

(56) References Cited

U.S. PATENT DOCUMENTS

| 6,725,157 | B1 | 4/2004 | Yu |
| 6,879,913 | B1 | 4/2005 | Yu |
| 2002/0198656 | A1 | 12/2002 | Ford et al. |
| 2003/0197641 | A1 | 10/2003 | Stone et al. |
| 2004/0181467 | A1* | 9/2004 | Raiyani et al. .................. 705/28 |
| 2007/0030841 | A1 | 2/2007 | Lee et al. |
| 2007/0281737 | A1* | 12/2007 | Zhao .......................... 455/552.1 |
| 2008/0084305 | A1* | 4/2008 | Arnold ....................... 340/572.1 |
| 2008/0254810 | A1* | 10/2008 | Fok et al. .................... 455/456.2 |

FOREIGN PATENT DOCUMENTS

| WO | WO2004086077 | A1 | 10/2004 |
| WO | 2007/076539 | A2 | 7/2007 |

OTHER PUBLICATIONS

Reference Document, The GPS Dictionary, Acronyms, Abbreviations, and Glossary Related to GPS, Mar. 8, 2001.
Indoor GPS Technology, Frank Van Diggelen, and Charles Abraham, Global Locate, Inc., May 2001.
Global Locate Indoor GPS Chipset & Services, Dr. Frank Van Diggelen, Global Locate, Inc., 2001.
Innovation, Receiver Frequency Standards, Optimizing Indoor GPS Performance, Larry D. Vittorini and Brent Robinson, Nov. 2003.
International Search Report—PCT/US2009/044644—International Search Authority, European Patent Office, Mar. 4, 2010.
ANO1 Indoor GPS, NAVSYNC, Receiver [Online], Nov. 15, 2004, Retrieved from the Internet < http://www.naysync.com/notes1.html>.
Dempster A., et al. "Indoor GPS: Positioning Challenges and Opportunities" (Invited Paper), IEEE 62nd Semiannual Vehicular Technology Conference, Dallas, Sep. 25-28, 2005, p. 4.
The QINETIQ., "Q20 High Sensitivity GPS Receiver Module", Winner—The IEE 2005 Electronics Engineering Innovation Award, 2005, p. 2.
Cho et al., "An Assisted GPS Acquisition Method using L2 Civil Signal in Weak Signal Environment," Journal of Global Positioning Systems, 2004, vol. 3, No. 1-2:25-31.
Zheng et al., "GPS Software Receiver Enhancements for Indoor Use," Proceedings of ION GNSS 2005 (Session C3), Long Beach, CA, Sep. 13-16, 2005, pp. 1-5.
Deshpande et al., "Interference Effects on the GPS Signal Acquisition," National Technical Meeting, Institute of Navigation, Jan. 26-28, 2004, pp. 1-11.

* cited by examiner

*Primary Examiner* — Dao L Phan
(74) *Attorney, Agent, or Firm* — Linda G. Gunderson (57) ABSTRACT

Methods, apparatuses and/or systems are provided for selectively initiating a first mode location determination process using a location determining device if an item is not substantially stationary, and selectively initiating at least a second mode location determination process using the location determining device if the item is substantially stationary.

44 Claims, 3 Drawing Sheets

MULTIPLE-MODE LOCATION DETERMINING METHODS AND SYSTEMS

BACKGROUND

I. Field

The subject matter disclosed herein relates to electrode location detection, and more particularly to location determining methods and systems that may selectively operate in different location determining modes.

II. Information

Wireless communication systems are fast becoming one of the most prevalent technologies in the digital information arena. Cellular telephone and other like communication systems now span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information.

Another popular and increasingly important wireless technology includes satellite positioning systems (SPS) such as, for example, the global positioning system (GPS), which allow various devices to determine their geographical location with some level of precision based on received wireless signals. GPS receivers, for example, may determine their approximate geographical location, altitude, and speed based on signals that are transmitted by a plurality of orbiting satellites.

SUMMARY

In certain exemplary implementations, methods, apparatuses and/or systems may be provided that may selectively initiate a first mode location determination process using a location determining device based, at least in part, on a determination that an item is not substantially stationary, and selectively initiate at least a second mode location determination process using the location determining device based, at least in part, on determination that the item is substantially stationary.

In certain further implementations, for example, methods, apparatuses and/or systems may determine, that the item is substantially stationary based, at least in part, on item identifying information. Here, for example, the item identifying information may is stored in a programmable memory and/or determined based, at least in part, on detected motion information. In certain exemplary implementations the method and system may also determine location information and transmit at least a portion of the location information in a signal through at least one communication link.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

An exemplary location determining device may include circuitry adapted to at least determine its geographical location to some level of accuracy based on at least one received wireless signal transmitted by at least one remote device.

In accordance with certain aspects as presented herein, certain location determining devices may be adapted to selectively operate in different modes when attempting to determine its location based on whether the location determining device may be moving or may be stationary (i.e., at least substantially stationary).

In a weak signal or blockage condition, one potential benefit of such a multiple-mode location determining device may be that a more sensitive operating mode may be selected if the location determining device determines that it may be stationary, while a less sensitive operating mode may be selected if the location determining device determines that it may be moving. An operative mode selection that takes advantage of the stationary nature of a device may be used to improve the signal detection performance of the location determining device. For example, in certain implementations, a stationary location determining device may operate in a more sensitive search mode that might allow for the reception and/or use of wireless signals that may have been too weak or otherwise have been undetected by a less sensitive search mode. Conversely, in certain implementations, a moving location determining device may operate in a less sensitive search mode that might allow for the reception and/or use of stronger wireless signals if available. Here, for example, the less sensitive search mode may be quicker to perform and such quickness may be desirable given the movement of the location determining device. Moreover, the less sensitive search mode may reduce power consumption, which may be beneficial for certain location determining devices.

Furthermore, in certain implementations, some location determining devices may be adapted for use with certain items that may move or be moved between various locations wherein the wireless signals, for example from SPS satellite-based transmitters, at certain locations may be substantially attenuated, reflected, and/or otherwise interfered with in some manner. By selecting a more sensitive search mode, for example, a multiple-mode location determining device may be able to determine its location or may be able to improve the accuracy of its location determination even in a highly compromised signal environment. For example, a more sensitive search mode may allow such a multiple-mode location determining device to determine its location or improve the accuracy of its location determination by detecting previously undetected signals and/or by detecting signals earlier. However, a more sensitive search mode may extend the period of time needed to complete a location determination process.

Consequently, it may be useful in certain implementations for the location determining device to determine if the item it is attached to is sufficiently stationary to allow time for a more sensitive search mode to be attempted. Thus, in accordance with certain aspects presented herein, a location determining device may include or otherwise be operatively coupled to one or more detection circuits that may be used to determine if an item is at least substantially stationary enough to allow for one or more different operating modes (e.g., extended search operating modes) to be attempted.

By way of example but not limitation, in certain exemplary implementations a detection circuit may include or otherwise be operatively coupled to a sensor that may detect actual or perceived movement or motion of the item, such as, an accelerometer, a magnetometer, a gyroscope, an odometer, a speedometer, a wheel sensor, a radar, a sonar, and/or other like motion detection sensor, device or mechanism.

In certain implementations, a Doppler or other like measurement from a signal from an SPS satellite may be used, at least in part, to detect motion of the item. For example, it may be determined if an item is stationary or not based, at least in part, on detected changes in Doppler, signal delay, and/or signal strength from pre-existing wireless signals.

By way of example but not limitation, in certain exemplary implementations a detection circuit may include or otherwise he operatively coupled to a memory or other like computer readable medium that identifies or otherwise indicates in some manner that an item may be at least substantially stationary. For example, "item identifying information" (e.g., data, signal, etc) may be read, received, or otherwise accessed in some manner by the detection circuit which is indicative of either a motion or stationary state of an "item". Such item identifying information may, for example, be dynamically established or pre-established (e.g., preprogrammed, etc.) depending on the item, situation, expected use or location, or other like consideration.

For example, if the item is an automobile, then such associated item identifying information may, for example, be dynamically established based, at least in part, on signals from a wheel sensor, an odometer, a speedometer, and/or some other on-board sensor or computer. Thus, if such automobile is parked, for example, in a parking complex that may interfere with SPS wireless signals, the automobile may be determined to be "substantially stationary". If the automobile is subsequently moved, then the item identifying information may reflect that the item is moving.

While an automobile may be designed to move about often, there may be other items that, while indeed moveable, are designed to move less often and hence may not require dynamic motion sensors. For example, if the item is a refrigerator designed installation in a kitchen, then the item identifying information may be preset, for example, preprogrammed in a memory circuit or the like, as always being a "substantially stationary" item (even during transport).

One possible benefit to attaching a multiple-mode location determining device to certain items may be to allow for asset tracking. Thus, for this reason and others, it may be beneficial for such a location determining device to include a communication interface or the like that may be adapted to allow for the location determining device to report its location and/or other like information to one or more other devices. For example, if a refrigerator with such a location determining device may be adapted to communicate with another device, for example, over a wired and/or wireless communication link. Consequently, if the refrigerator had been stolen or otherwise transported to an unintended location the owner may be able to determine its location based on location or other like information that may be established by the location determining device attached to or otherwise included with the refrigerator and transmitted to an asset tracking device or service. In addition, once a location is determined, such location may be stored and/or may not need to be re-determined unless or until the item is moved; such may be beneficial, for example, to help reduce power consumption.

Figure 1:
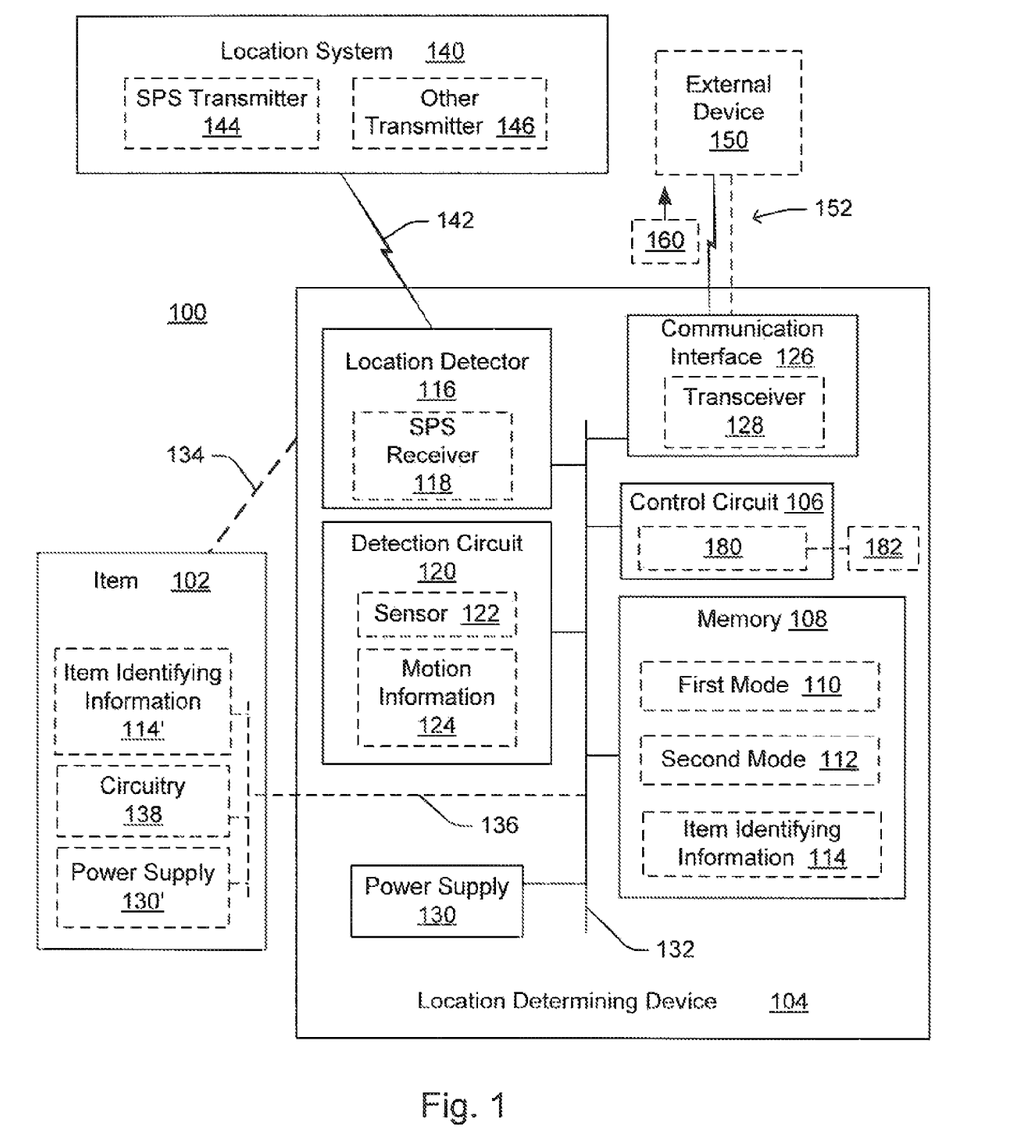
FIG. 1 is block diagram illustrating an exemplary system having a multiple-mode location determining device.

Attention is now drawn to FIG. 1, which is a block diagram illustrating an exemplary system 100 that may include an item 102, a location determining device 104, a location system 140, and an external device 150. As represented by attachment 134, location determining device 104 may be attached or otherwise arranged in some manner with item 102.

Herein, item 102 is intended to represent any item that may be moved from one location to another location. Some earlier examples included some machines such as an automobile and a refrigerator. Other examples include: other types of machines, various appliances or devices such as entertainment devices (e.g., televisions, radios, musical instruments, etc.), computing devices (e.g., desktop, laptop, server, or other like computers, etc.), various communication devices (e.g., mobile telephones, portable digital assistants, a personal location or tracking device, an SPS related device, etc.), and various articles of inventory or merchandise. Item 102 may include an electronic component or subsystem and may, therefore, take the form of an integrated circuit or circuit board or the like. Item 102 may include, for example, various parts, supplies, commodities or other like resources that may be shipped, for example, via ship, plane, rail cars, containers, pallets, boxes, etc. Indeed, item 102 may include, for example, a ship, a plane, a rail car, a container, a pallet, a box, or other like shipping resources. These are but a few examples.

In certain implementations, location determining device 104 may be included within and/or take the form of a device, a subsystem of a device, one or more integrated circuits or portions thereof, a circuit board, etc. All or part of location determining device 104 may be implemented through hardware, firmware, software, computer readable media and instructions, or the like, and/or any combination thereof.

As shown in this example, location determining device 104 may include a control circuit 106, memory 108, a location detector 116, a detection circuit 120, a communication interface 126, and a power supply 130. For illustrative purposes, these exemplary elements are shown as being operatively coupled together by bus 132, which is representative of one more electrical, magnetic optical, and/or logical connections and/or other like components that may be used to implement location determining device 104. Additionally, one or more of the exemplary elements in location determining device 104 may be operatively coupled to elements provided in item 102. For example, connection 136 is shown coupling bus 132 to some exemplary elements that may be provided in item 102. By way of example but not limitation, item 102 may include a power supply 130', other circuitry 138, and/or item identifying information 114', which are optional and described in greater detail in subsequent sections.

Additional operative coupling is illustrated in FIG. 1 by wireless signal(s) 142 between location system 140 and location detector 116 of location determining device 104. Here, for example, an SPS transmitter 144 and/or other transmitter 146 may transmit one or more wireless signals that may be used by location determining device 104 to determine location information, such as an estimate of the location of the location determining device 104 and/or information that may be used in computing such an estimate (e.g., time). For example, location detector 116 may include an SPS receiver 118 that receives SPS signal(s) and from such determines or attempts to determine such location information.

Here, for example, location detector 116 may be adapted to selectively perform different location determination processes, which are referred to as modes. For example, location detector 116 may selectively perform a first mode location determination process if item 120 detects motion and it is determined that wireless signal(s) 142 may be received. Such a first mode location determination process may, for example, include a SPS signal search operation having a total signal integration period of approximately 32 seconds or less, and/or which includes a plurality of coherent integration periods of which no coherent integration period exceeds approximately 80 ms. An SPS signal search operation may, for example, include attempting to acquire SPS signals and perform code phase detection, and/or otherwise attempting to determine pseudo range measurements from SPS signals.

Location detector 116 may selectively perform a second mode location determination process if item 120 is determined to be at least substantially stationary. Such a second mode location determination process may, for example, include a SPS signal search operation having a total signal integration period greater than approximately 32 seconds, and/or including a plurality of coherent integration periods of which at least one coherent integration period exceeds approximately 80 ms.

In certain exemplary implementations, a plurality of location determination processes (of the same mode or of different modes) may be conducted and all or a portion of any results therefrom may be combined in some manner or otherwise used in some manner to establish a location determination (e.g., perhaps more accurate) through filtering, averaging, and/or other like data processing and/or statistical analysis techniques.

These are but a few examples, and it should be clear that the exemplary techniques provided herein may be adapted to allow other location detectors and or location determining devices to selectively perform one or more other different mode location determination processes.

Location detector 116 may, for example, selectively switch between certain mode location determination processes under the control and/or as instructed to by control circuit 106. Location detector 116 may, for example, selectively perform selected mode location determination processes under the control and/or as instructed to by control circuit 106. Control circuit 106 may, for example, be adapted to determine a desired mode and/or to otherwise indicate the desired mode and/or parameters associated with a desired mode or modes to location detector 116. The desired mode or modes may, for example, modify in some maimer operation of SPS receiver 118. For example, a desired mode may affect one or more integration periods implemented by SPS receiver 118. For example, a desired mode may affect a sensitivity parameter and/or other like selectable or adjustable operating parameter or feature of SPS receiver. 118. For example, a desired mode may affect a power level and/or gain parameter and/or other like selectable or adjustable operating parameter or feature of SPS receiver 118. For example, a desired mode may affect an antenna-related parameter and/or other like selectable or adjustable operating parameter or feature of SPS receiver 118. These are but a few examples; those skilled in the art will recognize that one or more such parameters or other like features may be affected and such will likely vary from design to design.

Additionally and/or optionally, in certain exemplary implementations location determining device 104 may include two or more location detectors, wherein each is adaptable to operate in accordance with a certain desired mode or modes. Similarly and/or optionally, in certain exemplary implementations location detector 116 may include two or more different SPS receivers, wherein each is adaptable to operate in accordance with a certain desired mode or modes. Indeed, in certain exemplary implementations, location detector 116 may include different multiple receivers for different location systems and hence desired mode or modes.

Control circuit 106 may include, for example, a processing unit or the like that may be responsive to instructions and/or information associated with a first mode 110, second mode 112, and/or item identifying information 114, which are illustrated in this example as being stored in memory 108 and accessible there through. First mode 110 may, for example, include instructions and/or data associated in some manner the exemplary first mode location determination process described above. Second mode 112 may, for example, include instructions and/or data associated in some manner the exemplary second mode location determination process as described above.

Item identifying information 114 may, for example, include instructions and/or data associated in some manner with an item that may be preset as a "substantially stationary" item. In certain implementations, for example, item identifying information 114' may be in addition and/or instead as provided in item 102. Control circuit 106 may, for example, respond to either item identifying information 114 and/or 114' to initiate or otherwise control the mode or modes of location detector 116.

In certain other exemplary implementations, control circuit 106 may similarly respond to detection circuit 120, which may consider item identifying information 114 and/or 114', and/or establish or otherwise provide motion information to control circuit 106 to initiate or otherwise control the mode or modes of location detector 116. Here, for example, detection circuit 120 may establish motion information 124 based on at least one sensor 122. Sensor 122 may, for example, detect actual or perceived movement or motion of item 102 and include an accelerometer, a magnetometer, a gyroscope, an odometer, a speedometer, a wheel sensor, a radar, a sonar, and/or other like motion detection sensor, device or mechanism.

Location detector 116 may, for example, establish location information through one or more modes of operation. At least a portion of location information 160 may be transmitted to or otherwise made accessible for another device, such as, external device 150 as shown in FIG. 1. Here, for example, communication interface 126 may include a transceiver or at least a transmitter adapted to share location information 160 over a communication link 152. As illustrated, link 152 may be wired and/or wireless. In certain implementations, transceiver 128 may include a modem or other like device and link 152 may include a telephone, the Internet, or other like wired or wireless communication system and/or other like resource through which information may be shared External device may include, for example, a computing or other like device.

Position determination techniques described herein may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT, GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Also depicted in the exemplary system 100 are power supplies 130 and 130'. Each of these exemplary power supplies may be representative of a power source used by location determining device 104 and/or possible circuitry 138 or other like circuits/devices that may be provided in or otherwise operatively coupled to item 102. Thus, in certain implementations, location determining device 104 may use local power provided by power supply 130 and/or external power provided by power supply 130'. These power supplies are representative of any applicable type of electrical power supply.

As used herein, a satellite positioning system (SPS) refers to one or more devices configurable to transmit wireless signal(s) 142. By way of example but not limitation, location system 140 may include the Global Positioning System (GPS), Galileo, GLONASS, NAVSTAR, Beidou, QZNSS, a system that uses satellites from a combination of these systems, or any SPS developed in the future.

Furthermore, as used herein, location system 140 may also include a "pseudolite" system. A pseudolite system may, for example, include ground-based transmitters, such as, other transmitter 146, that may broadcast a PN code or other ranging code (similar to a GPS or CDMA cellular signal) modulated on an L-band (or other frequency) carrier signal, and which may be synchronized with GPS time. Each such transmitter may, for example, be assigned a unique PN code so as to permit identification by a remote receiver such as mobile terminal 108. Such a pseudolite system may, for example, be useful in situations where GPS signals from an orbiting satellite might be unavailable, such as in tunnels, mines, buildings, urban canyons or other enclosed areas.

The methodologies described herein may be implemented by various means depending upon the application. For example, these methodologies may be implemented in hardware, firmware, software, or a combination thereof. For a hardware implementation, control circuit 106 may be implemented within one or processing units 180, which may include, for example, one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may, for example, be implemented with modules (e.g., procedures, functions, and so on) that perform the functions described herein. Any machine or computer readable medium tangibly embodying instructions may be used in implementing the methodologies described herein. For example, software codes or instructions and other data may be stored in memory, for example memory 108, and executed by control circuit 106 or other like circuits within location determining device 104. In certain implementations, for example, a computer readable medium 182 may be provided with such software codes, instructions and/or other like data.

Computer readable medium 182 may, for example, be adapted to provide such software codes, instructions and/or other like data to one or more processing units 180.

As used herein the term "memory" refers to any type of long term, short term, volatile, nonvolatile, or other memory and is not to be limited to any particular type of memory or number of memories, or type of media upon which information may be stored.

In certain exemplary implementations, the functions described herein may be implemented in hardware, software, firmware, or any combination thereof. If implemented in software, the functions may be stored on or transmitted over as one or more instructions or code on a computer-readable medium 182. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 2:
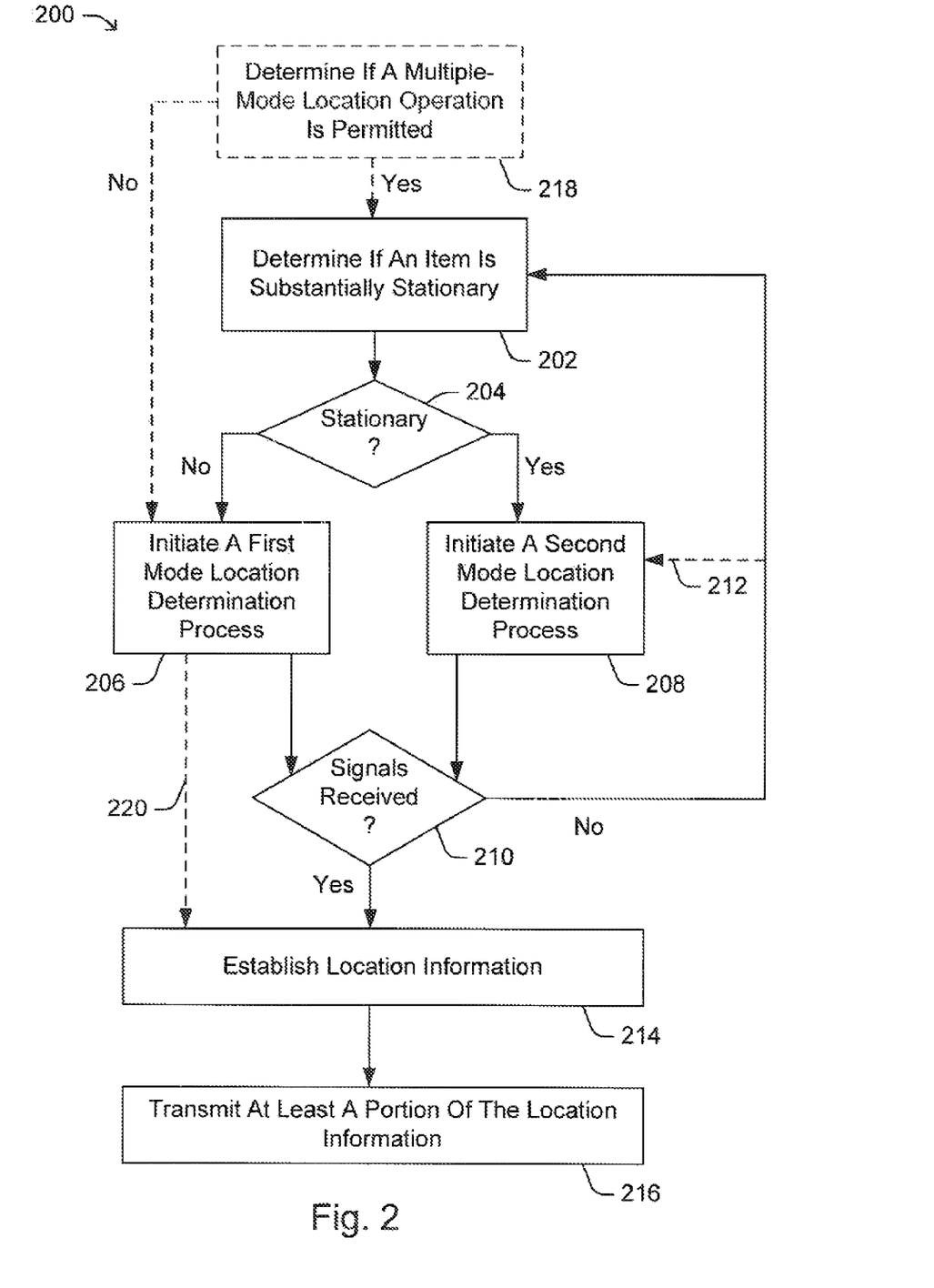
FIG. 2 is a flow-diagram illustrating an exemplary method that may be implemented in a system having a multiple-mode location determining device, for example, as in FIG. 1.

Attention is now drawn to FIG. 2, which is a flow-diagram illustrating an exemplary method 200 that may be implemented in a system having a multiple-mode location determining device, for example, as in FIG. 1.

At block 202 it is determined is an item is substantially stationary. For example, an item may be determined to be substantially stationary based on item identifying information and/or detected motion information.

At block 204 if the item is determined to not be substantially stationary, then at block 206 a first mode location determination process may be initiated or otherwise conducted. Conversely, at block 204 if the item is determined to be substantially stationary, then at block 208 a second mode location determination process may be initiated or otherwise conducted.

In certain implementations, at one or more of blocks 206, 208, 210, and/or 214 a plurality of location determination processes may be initiated or otherwise conducted and the results combined in some manner to establish the location information. For example, block 206 may include a plurality of first mode location determination processes, block 208 may include a plurality of second mode location determination processes, block 210 may include a decision based on the results of a plurality of location determination processes, and/or block 214 may include establishing location information based on a plurality of location determination processes. Those skilled in the art will recognize that method 200 may also be adapted to support additional and/or other types of mode location determination processes beyond the first and second modes as presented in this example.

At block 210 if applicable signals have been received via either first mode location determination process of block 206 or second mode location determination process of block 208, then at block 214 location information for the item may be established. At block 216, at least a portion of the location information may be transmitted, for example, to an external device.

However, back at block 210, if applicable signals have not been received via either first mode location determination process of block 206 or second mode location determination process of block 208, then method 200 may return to block 202. Optionally, for example, if applicable signals have not been received via first mode location determination process of block 206 then per dashed arrow 212, method 200 may include switching to a second mode location determination process per block 208. However, if applicable signals have not been received via second mode location determination process of block 208 then method 200 may include returning to block 202.

In this example, first and second mode location determination processes may correspond to the earlier examples wherein the second mode is more adapted to be more sensitive than the first mode in some manner.

By way of example but not limitation, the second mode may be adapted to search for SPS signals over a longer period of time than the first mode, the second mode may be adapted to amplify signals more than the first mode, the second mode may be adapted to employ higher antenna gain than the first mode, and/or employ other like performance features or enhancements that may allow for the second mode to be more sensitive and possibly receive weak, attenuated or otherwise interfered with SPS signals than might the first mode. In certain implementations, the sensitivity differences in modes may, for example, affect in some manner processing (e.g., code phase data processing, Doppler data processing), tolerance for different signal ratios (e.g., a signal-to-noise ratio (SNR), a signal-to-interference ratio (SIR), etc.); operating periods (e.g., integration, acquisition, detection periods), and/or the like associated with SPS signal reception and/or processing.

Consequently, the first mode at block 206 may be selectively used when the item is not stationary and the second mode at block 208 may be selectively used if the first mode fails to adequately receive the wireless signals at block 210 and/or the item is determined to be at least substantially stationary at block 202.

In certain other exemplary implementations, method 200 may include block 218 wherein it is determined if a multiple-mode location operation is permitted. For example, in certain implementations, a location determining device and/or item may be configured at some point to specify if multiple-mode location operations are permitted. As illustrated in FIG. 2, if multiple-mode location operations are permitted then method 200 may, for example, proceed to block 202. If multiple-mode location operations are not permitted then method 200 may, for example, proceed to block 206 to initiate a first mode location determination process. As further illustrated by arrow 220, when a multiple-mode location operation is not permitted once signals are received at block 206, then method 200 may continue to block 214 directly.

Figure 3A:
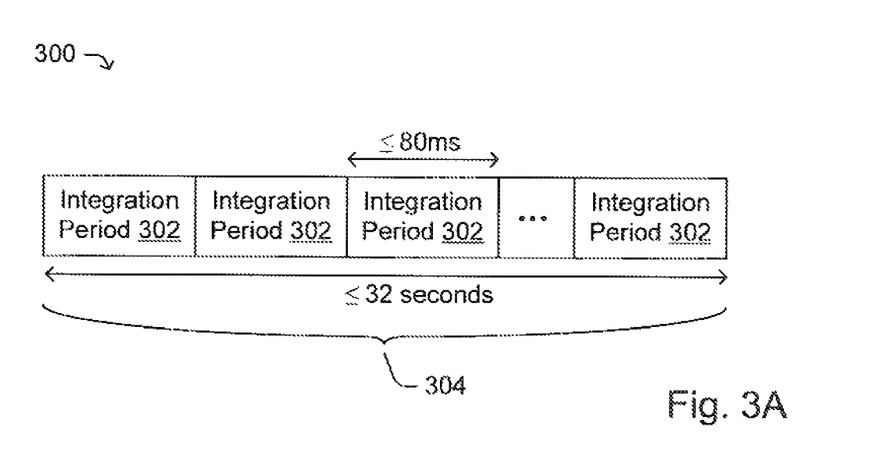
FIG. 3A is an exemplary illustrative timeline showing a signal search operation that may be associated with a first mode location determination process that may be implemented in a system having a multiple-mode location determining device, for example, as in FIG. 1.

FIG. 3A is an exemplary illustrative timeline 300 showing a signal search operation that may be associated with a first mode location determination process, for example at block 206 of FIG. 2, that may be implemented in a system having a multiple-mode location determining device, for example location determining device 104 of FIG. 1. Here, in this example, a first mode location determination process may include a satellite positioning system (SPS) signal search operation having a total signal integration period 304 that is approximately 32 seconds or less in duration, and/or wherein each of a plurality of coherent integration periods 302 are approximately 80 ms or less in duration. Thus, FIG. 3A may represent a "Dynamic Search Mode" which may include, for example, a search operation, possibly consisting of varying search modes typically with 80 ms or less intervals of coherent integration and/or periods of signal integration of 32 seconds or less.

Figure 3B:
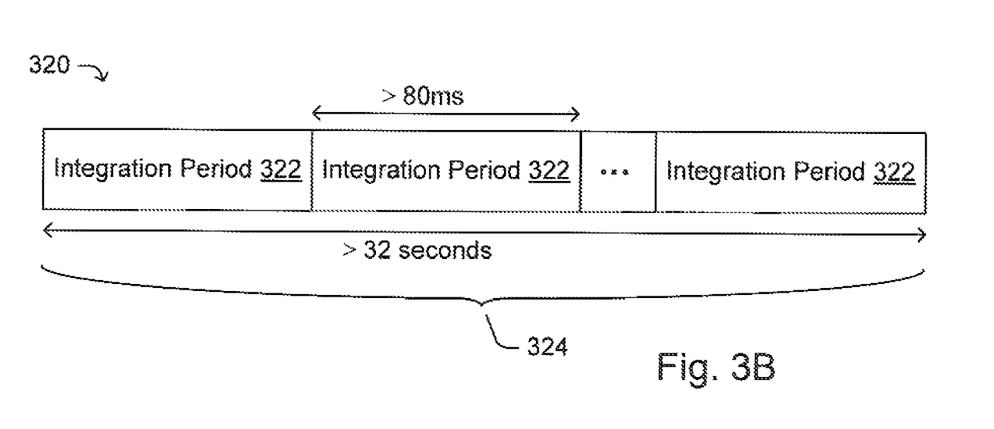
FIG. 3B is an exemplary illustrative timeline showing a signal search operation that may be associated with a second mode location determination process that may be implemented in a system having a multiple-mode location determining device, for example, as in FIG. 1.

FIG. 3B is an exemplary illustrative timeline 320 showing a signal search operation that may be associated with a second mode location determination process, for example at block 208 of FIG. 2, that may be implemented in a system having a multiple-mode location determining device, for example location determining device 104 of FIG. 1. Here, in this example, a second mode location determination process may include an SPS signal search operation having a total signal integration period 324 that is greater than approximately 32 seconds in duration, and/or wherein at least one of a plurality of coherent integration periods 322 is greater than approximately 80 ms in duration. Thus, FIG. 3B may represent an exemplary "Ultra-deep Mode" that may include a combination of longer periods of coherent integration (e.g., >80 ms of coherent integration) and/or a longer total period of GPS signal integration (e.g., greater than 32 seconds). Here, for example, if an item is substantially stationary, longer integration times and/or longer coherent integration may be performed because frequency search windows, satellite movement, etc, may be more predictable relative to the item than if the item is moving, particularly at higher rates of speed.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
   selectively initiating a first mode location determination process using a location determining device based, at least in part, on a determination that an item is not substantially stationary; and
   selectively initiating at least a second mode location determination process using said location determining device based, at least in part, on determination that said item is substantially stationary;
   wherein the second mode location determination process comprises using at least one coherent integration period that is longer than a longest coherent integration period of the first mode location determination process.

2. The method as recited in claim 1, wherein said location determining device comprises a satellite positioning system (SPS) receiver.

3. The method as recited in claim 1, wherein said first mode location determination process comprises a signal search operation having a total signal integration period of 32 seconds or less.

4. The method as recited in claim 3, wherein said first mode location determination process comprises a signal search operation having a total signal integration period comprising a plurality of coherent integration periods of which no coherent integration period exceeds 80 ms.

5. The method as recited in claim 1, wherein said second mode location determination process comprises a signal search operation having the total signal integration period that is greater than 32 seconds.

6. The method as recited in claim 1, wherein said second mode location determination process comprises a signal search operation having the total signal integration period comprising a plurality of coherent integration periods of which at least one coherent integration period exceeds 80 ms.

7. The method as recited in claim 1, and further comprising:
determining that said item is substantially stationary based, at least in part, on item identifying information.

8. The method as recited in claim 7, wherein said item identifying information is stored in a programmable memory.

9. The method as recited in claim 1, and further comprising:
determining that said item is substantially stationary based, at least in part, on detected motion information.

10. The method as recited in claim 9, wherein determining that said item is substantially stationary based, at least in part, on said detected motion information comprises generating said detected motion information using a detection circuit attached to said item.

11. The method as recited in claim 10, wherein said detection circuit comprises at least one motion detection device comprising at least one of an accelerometer, a magnetometer, a gyroscope, an odometer, a speedometer, a wheel sensor, a radar, and/or a sonar.

12. The method as recited in claim 1, further comprising:
determining location information associated with a determined location of said item using said location determining device; and
transmitting at least a portion of said location information in a signal through at least one communication link comprising at least one of a wired communication link and/or a wireless communication link.

13. The method as recited in claim 1, wherein selectively initiating at least said second mode location determination process using said location determining device based, at least in part, on determination that said item is substantially stationary further comprises selectively initiating a plurality of mode location determination processes.

14. The method as recited in claim 13, further comprising establishing a location determination based, at least in part, on location information associated with at least a portion of said plurality of mode location determination processes.

15. An apparatus comprising:
means for determining if an item is substantially stationary; and
means for determining a location of said item; and
means for selectively initiating at least one of a plurality of location determination processes for said means for determining said location of said item, said plurality of location determination processes comprising at least a first mode location determination process and a second mode location determination process, wherein said means for selectively initiating said at least one of said plurality of location determination processes initiates said first mode location determination process if said item is determined to not be substantially stationary, and initiates at least said second mode location determination process if said item is determined to be substantially stationary, wherein the second mode location determination process comprises using at least one coherent integration period that is longer than a longest coherent integration period of the first mode location determination process.

16. The apparatus as recited in claim 15, wherein:
said first mode location determination process comprises a satellite positioning system (SPS) signal search operation having a total signal integration period of 32 seconds or less, and
said second mode location determination process comprises an extended satellite positioning system (SPS) signal search operation having the total signal integration period that is greater than 32 seconds.

17. The apparatus as recited in claim 15, wherein:
said first mode location determination process comprises a satellite positioning system (SPS) signal search operation having a total signal integration period comprising a plurality of coherent integration periods of which no coherent integration period exceeds 80 ms, and
said second mode location determination process comprises an extended satellite positioning system (SPS) signal search operation having the total signal integration period comprising a plurality of extended coherent integration periods of which at least one extended coherent integration period exceeds 80 ms in length.

18. The apparatus as recited in claim 15, wherein said means for determining if said item is said substantially stationary is adapted to determine if said item is said substantially stationary based, at least in part, on at least one type of information comprising at least one of item identifying information andor detected motion information.

19. The apparatus as recited in claim 15, wherein said means for determining said location of said item is adapted to establish location information for said item, and the apparatus further comprises:
means for transmitting at least a portion of said location information in a signal through at least one communication link comprising at least one of a wired communication link and/or a wireless communication link.

20. The apparatus as recited in claim 15, wherein said means for determining said location of said item determines said location of said item based, at least in part, using at least a portion of location information associated with at least two of said plurality of mode location determination processes.

21. A system comprising:
at least one item; and
a location determining device attached to said at least one item, said location determining device comprising a detection circuit adapted to determine at least if said item is substantially stationary, a satellite positioning system (SPS) receiver, and a control circuit operatively coupled to said detection circuit and said SPS receiver and adapted to selectively initiate a first mode location determination process using said SPS receiver if said item is not substantially stationary, and selectively initiate at least a second mode location determination process using said SPS receiver if said item is substantially stationary, wherein the second mode location determination process comprises using at least one coherent integration period that is longer than a longest coherent integration period of the first mode location determination process.

22. The system as recited in claim 21, wherein:
said first mode location determination process comprises a signal search operation having a total signal integration period of 32 seconds or less, and
said second mode location determination process comprises the signal search operation having the total signal integration period greater than 32 seconds.

23. The system as recited in claim 21, wherein:
said first mode location determination process comprises a signal search operation having a total signal integration period comprising a plurality of coherent integration periods of which no coherent integration period exceeds 80 ms, and
said second mode location determination process comprises the signal search operation having the total signal integration period comprising a plurality of extended coherent integration periods of which at least one extended coherent integration period exceeds 80 ms.

24. The system as recited in claim 21, wherein said SPS receiver is adapted to establish location information for said item, and said location determining device further comprises a transmitter operatively coupled to at least said control circuit and adapted to transmit at least a portion of said location information in a signal through at least one communication link comprising at least one of a wired communication link andor a wireless communication link.

25. The system as recited in claim 21, wherein said control circuit is adapted to selectively initiate a plurality of mode location determination processes using said SPS receiver if said item is determined to be substantially stationary.

26. The system as recited in claim 25, said location determining device further comprising a location detector coupled to said SPS receiver and adapted to establish a location determination based, at least in part, on at least a portion of location information for said item associated with at least a portion of said plurality of mode location determination processes.

27. The system as recited in claim 21, and further comprising;
a detection circuit attached to at least one of said item or said location determining device, said detection circuit being adapted to determine if said item is substantially stationary or is not substantially stationary based, at least in part, on item identifying information.

28. The system as recited in claim 27, wherein said detection circuit comprises a programmable memory adapted to store said item identifying information.

29. The system as recited in claim 27, wherein said detection circuit comprises at least one motion detection device, said at least one motion detection device being adapted to generate said detected motion information.

30. The system as recited in claim 29, wherein said at least one motion detection device comprises at least one of an accelerometer, a magnetometer, a gyroscope, an odometer, a speedometer, a wheel sensor, a radar, and a sonar.

31. A computer readable medium comprising computer implementable instructions stored thereon, which if implemented adapt one or more processing units to:
selectively initiate a first mode location determination process using a location determining device based, at least in part, on a determination that an item is not substantially stationary; and
selectively initiate at least a second mode location determination process using said location determining device based, at least in part, on determination that said item is substantially stationary;
wherein the second mode location determination process comprises using at least one coherent integration period that is longer than a longest coherent integration period of the first mode location determination process.

32. The computer readable medium as recited in claim 31, wherein said location determining device comprises a satellite positioning system (SPS) receiver.

33. The computer readable medium as recited in claim 31, wherein said first mode location determination process comprises a signal search operation having a total signal integration period of 32 seconds or less.

34. The computer readable medium as recited in claim 33, wherein said first mode location determination process comprises a signal search operation having a total signal integration period comprising a plurality of coherent integration periods of which no coherent integration period exceeds 80 ms.

35. The computer readable medium as recited in claim 31, wherein said second mode location determination process comprises a signal search operation having the total signal integration period that is greater than 32 seconds.

36. The computer readable medium as recited in claim 31, wherein said second mode location determination process comprises a signal search operation having the total signal integration period comprising a plurality of coherent integration periods of which at least one coherent integration period exceeds 80 ms.

37. The computer readable medium as recited in claim 31, comprising further computer implementable instructions stored thereon, which if implemented adapt said one or more processing units to:
initiate a determination that said item is substantially stationary based, at least in part, on item identifying information.

38. The computer readable medium as recited in claim 37, wherein said item identifying information is stored in a programmable memory.

39. The computer readable medium as recited in claim 31, comprising further computer ,implementable instructions stored thereon, which if implemented adapt said one or more processing units to;
initiate a determination that said item is substantially stationary based, at least in part, on detected motion information.

40. The computer readable medium as recited, in claim 39, wherein said further computer implementable instructions, if implemented, adapt said one or more processing units to determine that said item is substantially stationary based, at least in part, on said detected motion information comprises generating said detected motion information using a detection circuit attached to said item.

41. The computer readable medium as recited in claim 40, wherein said detection circuit comprises at least one of an accelerometer, a magnetometer, a gyroscope, an odometer, a speedometer, a wheel sensor, a radar, and a sonar.

42. The computer readable medium as recited in claim 31, comprising further computer implementable instructions stored thereon, which if implemented adapt said one or more processing units to:
initiate a determination of location information associated with a determined location of said item using said location determining device; and
initiate a transmission of at least a portion of said location information in a signal through at least one communication link.

43. The computer readable medium as recited in claim 31, comprising further computer implementable instructions stored thereon, which if implemented adapt said one or more processing units to selectively initiate a plurality of mode location determination processes.

44. The computer readable medium as recited in claim 43, comprising further computer implementable instructions stored thereon, which if implemented adapt said one or more processing units to initiate determination of a location determination based, at least in part, on location information associated with at least a portion of said plurality of mode location determination processes.

* * * * *